UNITED STATES PATENT OFFICE.

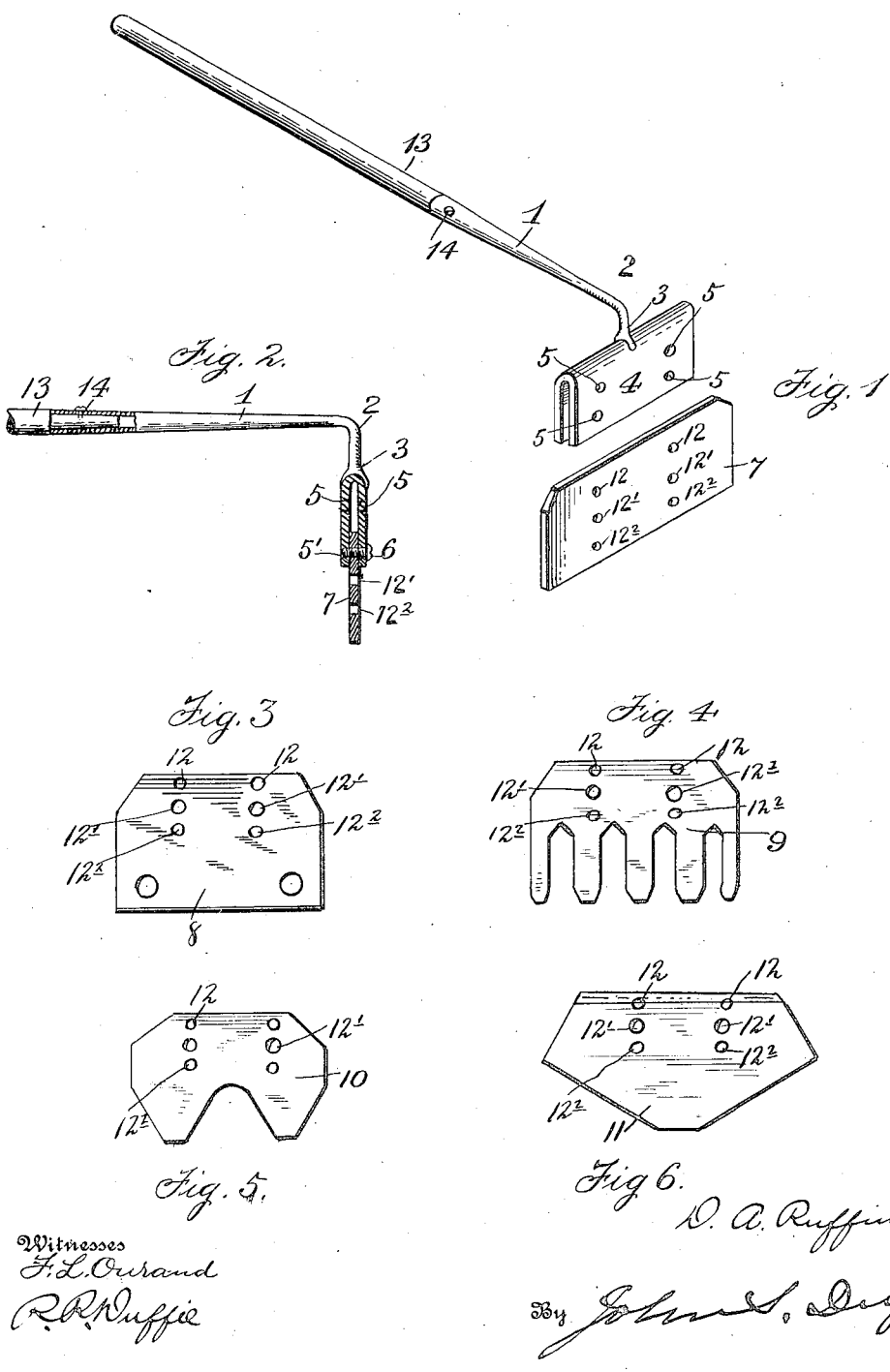

DAVID ALBERT RUFFIN, OF HOT SPRINGS, ARKANSAS.

FARMING IMPLEMENT.

No. 917,144.   Specification of Letters Patent.   Patented April 6, 1909.

Application filed July 7, 1908. Serial No. 442,319.

*To all whom it may concern:*

Be it known that I, DAVID ALBERT RUFFIN, a citizen of the United States, residing at Hot Springs, in the county of Garland and State of Arkansas, have invented certain new and useful Improvements in Farming Implements, of which the following is a specification.

My invention has relation to new and useful improvements in farming implements such as hoes, rakes or the like and especially to the handle used therefor.

The object of my invention is to produce an article of manufacture which may be of great utility to farmers, enabling them to have as many varieties of implements of the kind herein-after specified, with the least possible expense.

Another object of my invention is the production of a device of the character herein specified, which may be adjustable, enabling a farmer to use a particular implement for such varied purposes as he may desire.

With these and other objects in view my invention consists of the novel construction and arrangement of parts as are herein-after fully described in the following specification, illustrated in the accompanying drawings forming a part thereof, and particularly pointed out in the claims hereunto appended.

In the drawings:—Figure 1 is a perspective view of my invention the hoe-blade thereof being removed for illustrative purposes. Fig. 2 is a vertical sectional view of my device, the hoe-blade in one of its several positions. Fig. 3 is a mortar hoe-blade, Fig. 4 is a potato hoe-blade, Fig. 5 is a garden hoe-blade, Fig. 6 is another form of a garden hoe-blade, all of which may be substituted for the form of blade shown in Fig. 1.

It is observed that the form of blade used may be varied indefinitely, and therefore I do not confine myself to those forms shown in the drawings but reserve the right to use in connection with my improved handle any form of cultivator that I may desire to employ.

Referring more particularly to the accompanying drawings my invention is described as follows:—The handle 1, which is preferably made of metal or other suitable material adapted for that purpose is bent at the smaller end 2, forming the portion 3, said portion being approximately at right angles to the rest of said handle 1. Secured to the lower end of the portion 3, is a vertical U-shaped clamping member 4, adapted for the purpose of receiving a hoe-blade of any desired design. Passing through said clamping member 4, are the perforations 5 and $5^1$, said perforations being adapted to receive the set screws 6. Passing through each of the hoe-blades 7, 8, 9, 10 and 11 are a series of holes 12, $12^1$ and $12^2$, adapting said blades to be adjustably received by said clamping member 4. Referring again to the handle, said handle is hollowed out a sufficient distance from the large end (see Fig. 2) to adapt it for the reception of an extension 13, said extension being held in position by means of a screw 14.

Though I have specifically described my invention I may exercise the right to make such alterations and modifications in the construction and arrangement of the several parts thereof as do not depart from the spirit of my invention, and as fall within the scope of my claims.

Having described my invention, what I claim as new and desire to secure by Letters Patent, is:—

1. In a device of the character described, a handle having secured to its smaller end an inverted U-shaped clamping member adapted to receive a hoe blade, said member having a plurality of vertically disposed rows of holes.

2. In a device of the character described, a handle bent near its smaller end forming a portion which is approximately at right angles to the main portion of said handle, an inverted U-shaped clamping member, having a plurality of vertically disposed rows of holes, secured to said bent portion, said clamping member adapted to receive a hoe blade having corresponding rows of holes, any one of which is adapted to register with any one of the holes in its corresponding row in said clamping member.

3. In a device of the character described, a handle bent near its smaller end forming a portion which is approximately at right angles to the main portion of said handle, an inverted U-shaped clamping member formed on the outer end of said first-mentioned portion, a hoe-blade received by said clamping member, said member and said hoe-blade having a plurality of corresponding rows of holes, any hole in either row of said member adapted to register with any hole in its corresponding row in said hoe-blade, set screws adapted to pass through said corresponding holes after registration, substantially as set forth.

4. In a device of the character described, a handle bent near its smaller end forming a portion which is approximately at right angles to the main portion of said handle, an inverted U-shaped clamping member formed on said bent portion, a hoe-blade received by said clamping member, said member having a plurality of vertically disposed rows of holes.

In testimony whereof I affix my signature, in presence of two witnesses.

DAVID ALBERT RUFFIN.

Witnesses:
R. G. DAVIES,
MARGARET C. DAVIES.